(12) United States Patent
Kim et al.

(10) Patent No.: US 9,651,384 B2
(45) Date of Patent: May 16, 2017

(54) SYSTEM AND METHOD FOR INDOOR NAVIGATION

(71) Applicant: KOREA INSTITUTE OF SCIENCE AND TECHNOLOGY, Seoul (KR)

(72) Inventors: Ig Jae Kim, Goyang-si (KR); Hee Dong Ko, Seoul (KR); Jong Weon Lee, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 114 days.

(21) Appl. No.: 13/736,175

(22) Filed: Jan. 8, 2013

(65) Prior Publication Data

US 2013/0297205 A1 Nov. 7, 2013

(30) Foreign Application Priority Data

May 2, 2012 (KR) .................. 10-2012-0046242

(51) Int. Cl.
*G01C 21/20* (2006.01)

(52) U.S. Cl.
CPC .................. *G01C 21/206* (2013.01)

(58) Field of Classification Search
CPC .................................................. G01C 21/206
See application file for complete search history.

(56) References Cited

U.S. PATENT DOCUMENTS

2009/0316951 A1* 12/2009 Soderstrom .................. 382/103
2011/0038540 A1 2/2011 Ahn et al.
2011/0304858 A1* 12/2011 Izumi et al. .................. 356/615
2012/0072111 A1* 3/2012 Davis et al. .................. 701/522
2012/0191287 A1* 7/2012 Shin et al. ...................... 701/28
2012/0209514 A1* 8/2012 Chrysanthakopoulos .... 701/431
2013/0101159 A1* 4/2013 Chao et al. .................... 382/103

FOREIGN PATENT DOCUMENTS

| JP | 09-053939 A | 2/1997 |
| JP | 2007-241085 | 9/2007 |
| JP | 2011-022157 A | 2/2011 |
| KR | 10-1999-015643 | 3/1999 |
| KR | 10-2007-0026673 | 3/2007 |
| KR | 10-0841712 B1 | 6/2008 |
| KR | 10-2009-0105745 A | 10/2009 |
| KR | 10-2009-0112349 | 10/2009 |
| KR | 10-2010-0021325 A | 2/2010 |
| KR | 10-0971777 B1 | 7/2010 |
| KR | 10-2010-0114819 A | 10/2010 |
| KR | WO 2011/013862 * | 2/2011 |
| KR | 10-2011-0134228 A | 12/2011 |

* cited by examiner

*Primary Examiner* — Jerrah Edwards
*Assistant Examiner* — Kelly D Williams
(74) *Attorney, Agent, or Firm* — NSIP Law

(57) ABSTRACT

The system for indoor navigation includes a global coordinate generator for dividing an indoor space, extracting a feature point where images photographed by cameras installed at predetermined locations overlap, and generating a global coordinate of the feature point, a database for storing information about the image and global coordinate of the feature point generated by the global coordinate generator, and a mobile device for extracting a feature point from an image of a surrounding environment photographed by a camera thereof, comparing the extracted feature point with the feature point stored in the database, and estimating location and direction thereof by using a global coordinate of a coincident feature point.

12 Claims, 5 Drawing Sheets

SYSTEM AND METHOD FOR INDOOR NAVIGATION

CROSS-REFERENCE TO RELATED APPLICATION

This application claims priority to Korean Patent Application No. 10-2012-0046242, filed on May 2, 2012, and all the benefits accruing therefrom under 35 U.S.C. §119, the contents of which in its entirety are herein incorporated by reference.

BACKGROUND

1. Field

The present disclosure relates to system and method for indoor navigation, and more particularly, to system and method for indoor navigation, which may provide location information of a user indoors based on an image obtained by photographing surrounding environments by using a mobile device provided with a camera.

2. Description of the Related Art

Recently, as mobile devices rapidly develop, many studies have been made on the method of implementing navigation on a mobile device. Conventionally, a GPS was used to estimate an actual movement of a user, which however has serious constraints of space. In other words, since the accuracy of GPS deteriorates indoors and at a downtown area, the conventional method is not available. Since GPS signals are ineffective in indoor environments, many methods using other signals such as WiFi, RFID, Bluetooth, ultrasonic wave, compass, G-meter or the like have been proposed.

However, the method for estimating a location in an indoor space should be improved further.

SUMMARY

The present disclosure is directed to providing system and method for indoor navigation, which may provide indoor location information to a user in an easy and simple way through a mobile device provided with a camera.

In one aspect, there is provided a system for indoor navigation, which traces an indoor location through a mobile device, the system including: a global coordinate generator for dividing an indoor space, extracting a feature point where images photographed by cameras installed at predetermined locations overlap, and generating a global coordinate of the feature point; a database for storing information about the image and global coordinate of the feature point generated by the global coordinate generator; and a mobile device for extracting a feature point from an image of a surrounding environment photographed by a camera thereof, comparing the extracted feature point with the feature point stored in the database, and estimating location and direction thereof by using a global coordinate of a coincident feature point.

The database may store the extracted image by applying histogram intensity patch (HIP) which changes angle and size of the image of the photographed feature point.

The database may be included in the mobile device and store information about image and global coordinate of the feature point in advance.

The mobile device may include a communication unit and receive information about image and global coordinate of the feature point stored in the database.

The global coordinate generator may photograph a target by using a camera at a predetermined location in an indoor space, and may generate a global coordinate from at least two photographed images by using the number of all pixels in the horizontal direction of an image plane photographed by the camera and a distance from the center of the image plane to the feature point.

The mobile device may include: a camera for photographing a specific indoor target; an image processing unit for processing an image of the target photographed by the camera to remove information about unnecessary regions around the target; a feature point extracting unit for extracting discriminating points in the image refined through the image processing unit; a feature point comparing unit for comparing the discriminating points extracted by the feature point extracting unit with the feature points stored in the database and extracting coincident feature points; and a location and direction recognizing unit for presenting location and direction of the mobile device in the indoor space by using global coordinates of the coincident feature points.

The mobile device may further include a compass for transferring orientation information of the mobile device to the location and direction recognizing unit.

In another aspect, there is provided a method for indoor navigation, which traces an indoor location through a mobile device, the method including: integrating images of indoor targets photographed by cameras in advance, generating a global coordinate of an overlapping feature point of the images, and storing image and global coordinate of the overlapping feature point in a database; extracting a feature point from an image of a surrounding environment photographed by a camera of the mobile device; and comparing the extracted feature point with the feature point stored in the database, and estimating indoor location and direction of the mobile device by using a global coordinate of a coincident feature point.

The database may store the extracted image by applying histogram intensity patch (HIP) which changes angle and size of the image of the feature point.

In the estimating of indoor location and direction, in a case where at least two feature points are extracted, orientation information input through a compass may be applied to expected candidate locations to estimate a location corresponding to the orientation condition.

The method for indoor navigation may further include photographing a target by using a camera at a predetermined location in an indoor space, and generating a global coordinate from at least two photographed images by using the number of all pixels in the horizontal direction of an image plane photographed by the camera and a distance from the center of the image plane to the feature point.

The system and method for indoor navigation according to the present disclosure may photograph surrounding environments by using a camera and provide location information of a user in an indoor space in an easy and simple way based on the photographed image even though the user is in an unfamiliar indoor environment.

BRIEF DESCRIPTION OF THE DRAWINGS

The above and other aspects, features and advantages of the disclosed exemplary embodiments will be more apparent from the following detailed description taken in conjunction with the accompanying drawings in which.

DETAILED DESCRIPTION OF MAIN ELEMENTS

Figure 1:
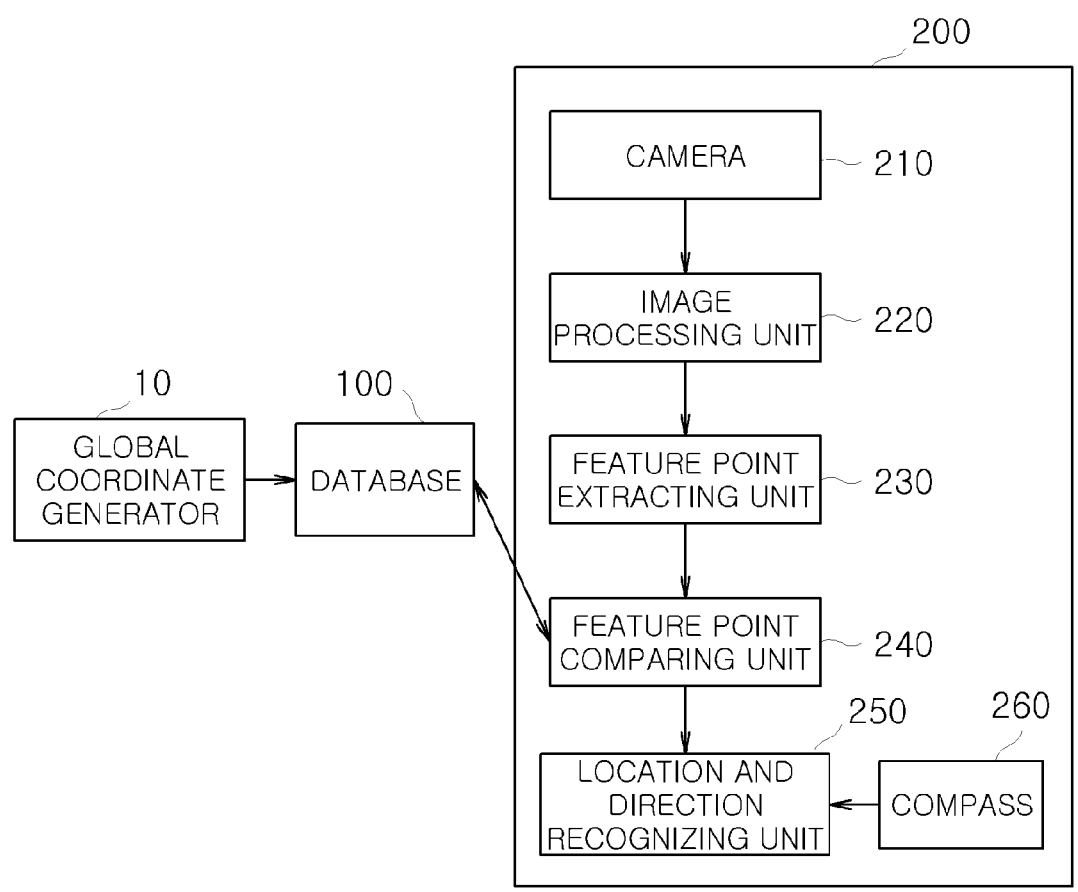
FIG. 1 is a block diagram showing a system for indoor navigation according to an embodiment of the present disclosure.

10: global coordinate generator
100: database
200: mobile device
210: camera
220: image processing unit
230: feature point extracting unit
240: feature point comparing unit
250: location and direction recognizing unit
260: compass

DETAILED DESCRIPTION

Hereinafter, system and method for indoor navigation according to exemplary embodiments of the present disclosure will be described in detail with reference to the accompanying drawings.

FIG. 1 is a block diagram showing a system for indoor navigation according to an embodiment of the present disclosure.

Referring to FIG. 1, the system for indoor navigation according to the present disclosure includes a global coordinate generator 10, a database 100 and a mobile device 200.

The global coordinate generator 10 divides an indoor space, extracts a feature where images photographed by a camera installed at a predetermined location overlap, and generates a global coordinate of the feature point. The process of generating a global coordinate of a feature point will be described later in detail with reference to FIGS. 2 and 3.

The database 100 stores information about image and global coordinate of the feature point generated by the global coordinate generator 10. The database 100 may be integrated with the mobile device 200. Meanwhile, in a case where the database 100 and the mobile device 200 are configured as separate modules, the mobile device 200 may be configured to receive the information about image and global coordinate of the feature point stored in the database 100 through a communication unit (not shown).

The mobile device 200 includes a camera 210, an image processing unit 220, a feature point extracting unit 230, a feature point comparing unit 240, and a location and direction recognizing unit 250, and may further include a compass 260 selectively.

If a specific indoor target is photographed by using the camera 210 for a user in an indoor space to check his location, the image processing unit 220 processes an image of the photographed target to remove information about unnecessary regions around the target. Then, the feature point extracting unit 230 extracts discriminating points in the image refined through the image processing unit 220. The feature point comparing unit 240 compares the discriminating points extracted by the feature point extracting unit 230 with the feature points stored in the database 100 to extract coincident feature points. The location and direction recognizing unit 250 presents location and direction of the mobile device 200 in the indoor space by using the global coordinates of the feature points. Here, in a case where a plurality of feature points are generated, a plurality of expected candidate locations of the mobile device 200 may be generated in the indoor space. At this time, if the orientation information of the mobile device 200 is known by the compass 260 in advance, a current location of the mobile device 200 corresponding to the orientation condition may be estimated.

Figure 2:
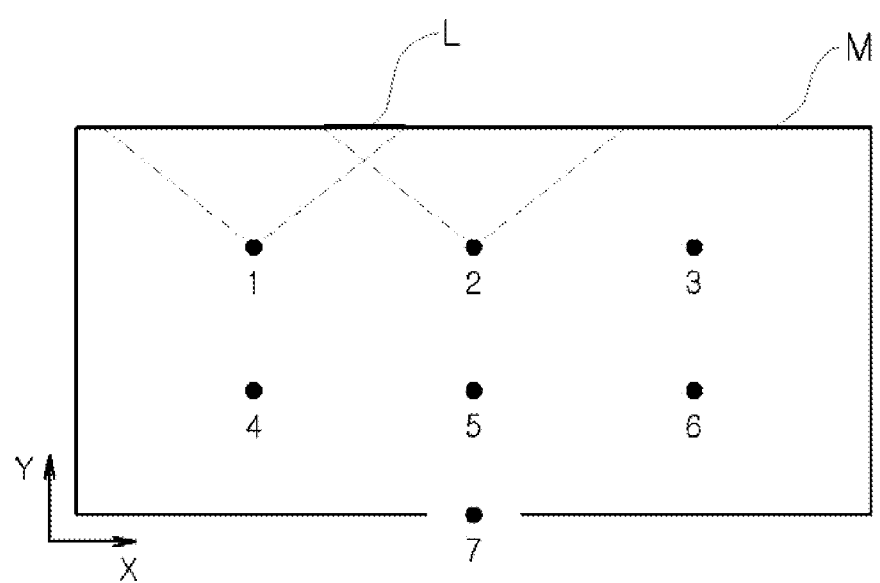
FIGS. 2 and 3 are diagrams for illustrating a process of extracting a global coordinate at a global coordinate generator shown in FIG. 1.
Figure 3:
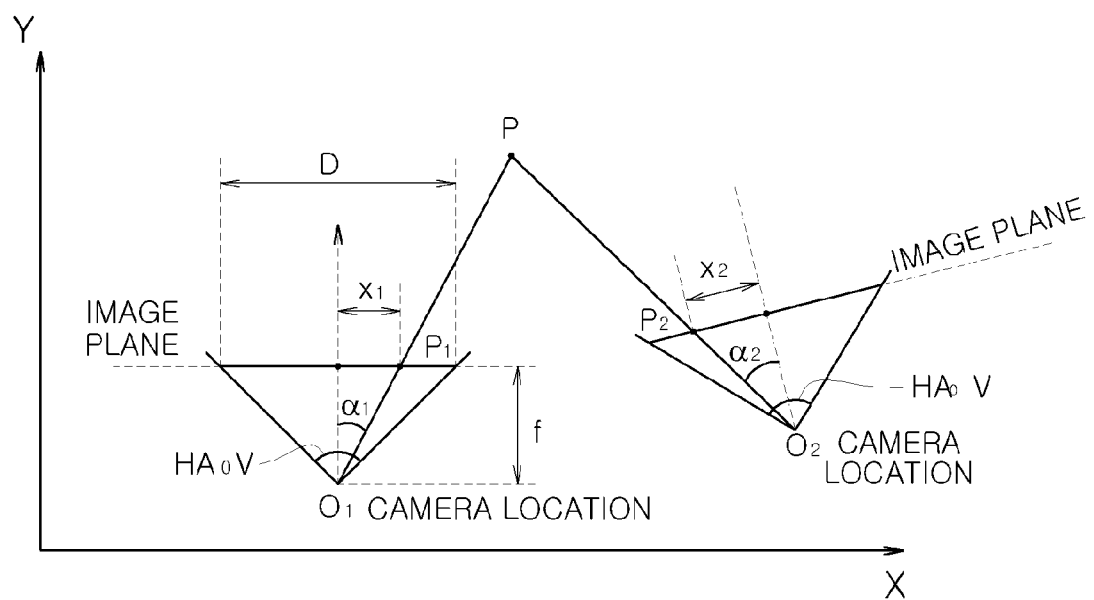

FIGS. 2 and 3 are diagrams for illustrating the process of extracting a global coordinate by the global coordinate generator of FIG. 1.

Referring to FIG. 2, the indoor space is divided at a predetermined ratio and cameras are located at a plurality of designated points, 7 points in this case. Here, coordinates of the cameras in the indoor space are known in advance. After that, a specific target M in the indoor space is photographed by the camera at each location. At this time, since each camera has a predetermined horizontal view, if images photographed by the cameras are compared, there is found an overlapping region. For example, the images photographed by the cameras located at the first and second points have an overlapping region L.

Referring to FIG. 3, the detailed process of extracting a feature point by using the overlapping region L will be described.

$O_1$ and $O_2$ represent locations of cameras in the indoor space, and a target is photographed by the cameras at predetermined locations and in predetermined directions. If a feature point overlapping on the image plane is extracted by comparing the images photographed by the two cameras, since coordinates of $O_1$ and $O_2$ are already known, $\alpha_1$ and $\alpha_2$ are calculated to obtain equations of $O_1$-$P_1$ and $O_2$-$P_2$ lines. By using two line equations, an intersecting point P may be obtained.

As described above, a camera has a horizontal view, which is defined as HAoV herein. HAoV may be expressed by using a trigonometrical function as follows.

$$HAoV = 2 \arctan\left(\frac{D}{2f}\right)$$
$$D = 2f \tan\left(\frac{HAoV}{2}\right)$$

Equation 1

Here, D represents the number of all pixels in the horizontal direction of the image plane photographed by a camera, and f represents an effective focus distance of the camera.

By using the effective focus distance f and the feature point $P_1$, $\alpha_1$ may also be expressed as follows by using a trigonometrical function.

$$\alpha_1 = \arctan\left(\frac{x_1}{f}\right)$$

Equation 2

In addition, the ratio $r_1$ may be defined as follows by using the number of pixels of the image.

$$r_1 = \frac{x_1}{D}$$

Equation 3

-continued $$x_1 = r_1 D$$

By integrating Equations 1 to 3, $\alpha_1$ may be resultantly expressed as follows.

$$\alpha_1 = \arctan\left(\frac{r_1 D}{f}\right) = \arctan\left(2r_1 \tan\left(\frac{HAoV}{2}\right)\right) \quad \text{Equation 4}$$

If HAoV is 90°, Equation 4 is arranged as follows.

$$\alpha_1 = \arctan(2r_1 \tan(45°)) = \arctan(2r_1) \quad \text{Equation 5}$$

Meanwhile, $\alpha_2$ may also be arranged as follows, in a way similar to $\alpha_1$.

$$\alpha_2 = \arctan\left(\frac{x_2}{f}\right) = \arctan(2r_2) \quad r_2 = \frac{x_2}{D} \quad \text{Equation 6}$$

If the values of $\alpha_1$ and $\alpha_2$ are obtained by using Equations 5 and 6, the equations for $O_1$-$P_1$ and $O_2$-$P_2$ lines may be obtained, and if its solution is calculated, the location of the global coordinate P may be determined.

In other words, the cameras may photograph a target at a predetermined location in the indoor space, and a global coordinate may be generated from at least two photographed images, by using the number of all pixels in the horizontal direction of an image plane photographed by the camera and distances $r_1$ and $r_2$ from the center of the image planes to the feature points.

The global coordinate generated by the global coordinate generator 10 as described above is stored in the database 100. Here, the database 100 may store the global coordinate of the extracted image by applying histogram intensity patch (HIP) which changes angle and size of the photographed image. This facilitates rapidly checking that, even though images of a single feature point are photographed at various distances and angles, the feature point in each image represents the same feature point.

Figure 4:
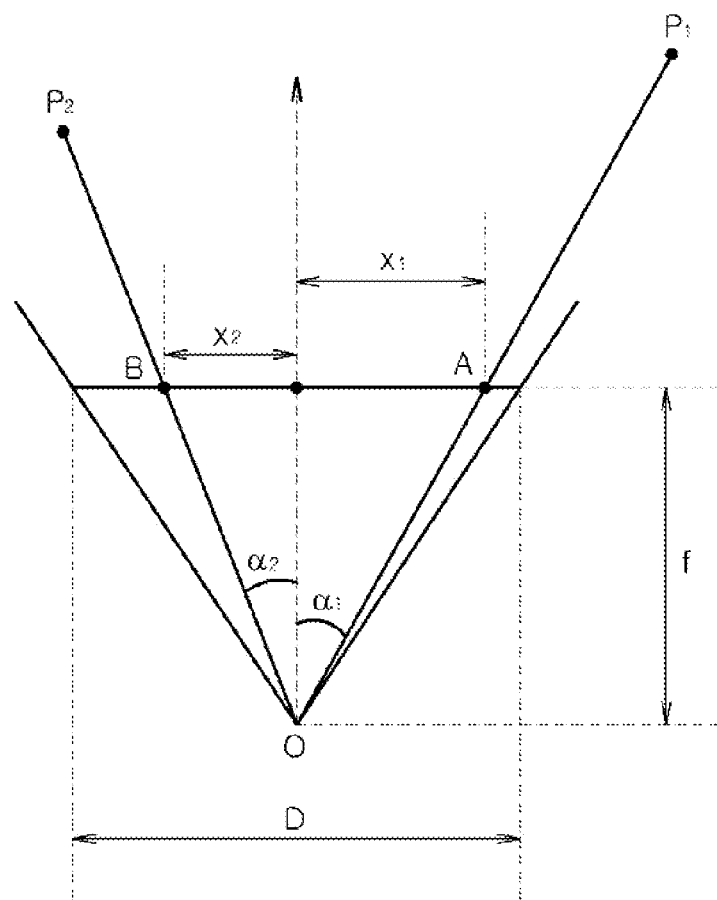
FIG. 4 is a diagram for illustrating estimation of an indoor location by using the mobile device of FIG. 1.

FIG. 4 is a diagram for illustrating estimation of an indoor location by using the mobile device of FIG. 1.

FIG. 4 shows a case where two feature points $P_1$ and $P_2$ are shown in the image photographed by the camera 210 of the mobile device 200, and two feature points $P_1$ and $P_2$ may appear at various points of the image photographed in the indoor space. At this time, if the mobile device 200 is provided with the compass 260, the orientation of the image plane may be determined as shown in the arrow depicted as a dotted line in FIG. 4.

Accordingly, distances $X_1$ and $X_2$ from the center of the image plane to the feature points A and B may be obtained, and by using this, $\alpha_1$ and $\alpha_2$ may also be calculated. Since the global coordinates of $P_1$ and $P_2$ are stored in the database 100, if $\alpha_1$ and $\alpha_2$ are known, the coordinate of the location O of the camera may also be estimated.

Figure 5:
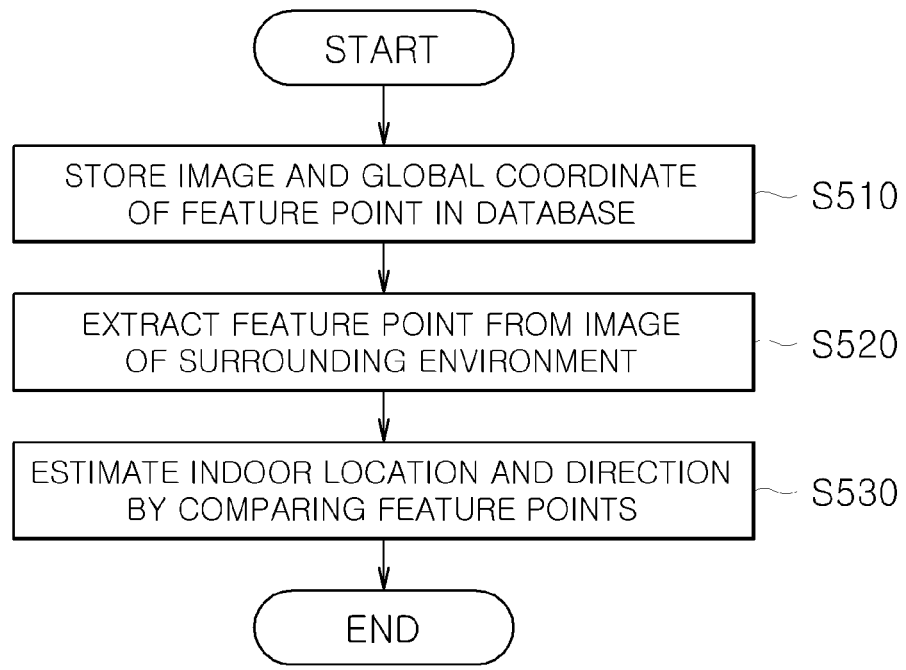
FIG. 5 is a flowchart for illustrating a method for indoor navigation according to an embodiment of the present disclosure.

FIG. 5 is a flowchart for illustrating a method for indoor navigation according to an embodiment of the present disclosure.

Referring to FIG. 5, as a method for indoor navigation, which traces an indoor location by using the mobile device 200, first, images of indoor targets photographed by using cameras are integrated. In addition, a global coordinate of a feature point coincident in the images is generated, and the image and global coordinate of the feature point are stored in the database 100 (S510). Here, the database 100 may store the extracted image by applying histogram intensity patch (HIP) which changes angle and size of the image of the feature point.

After that, a user entering the indoor space photographs a surrounding environment by using the camera 210 of the mobile device 200, and a feature point is extracted from the photographed image (S520).

Next, the extracted feature point is compared with the feature point stored in the database, and indoor location and direction of the mobile device are estimated by using the global coordinate of the coincident feature point (S530). Here, in a case where at least two feature points are extracted, the orientation information input through the compass 260 is applied to expected candidate locations to estimate a location corresponding to the orientation condition.

While the exemplary embodiments have been shown and described, it will be understood by those skilled in the art that various changes in form and details may be made thereto without departing from the spirit and scope of the present disclosure as defined by the appended claims.

What is claimed is:

1. A system for indoor navigation, which traces an indoor location through a mobile device, the system comprising:
    a global coordinate generator for dividing an indoor space, extracting a plurality of generated feature points where images photographed by cameras installed at predetermined locations within an area the mobile device is to be located overlap, and generating a global coordinate for each of the generated feature points;
    a database for storing information about the images and global coordinates of the generated feature points generated by the global coordinate generator; and
    the mobile device for extracting a plurality of acquired feature points from an image of a surrounding environment photographed by a camera included in the mobile device, comparing the acquired feature points with the generated feature points stored in the database, and estimating a global coordinate and direction of the mobile device based on any generated feature points that coincide with any acquired feature points.

2. The system for indoor navigation according to claim 1, wherein the database stores the extracted images by applying histogram intensity patch (HIP) which changes angle and size of the images of the photographed feature points.

3. The system for indoor navigation according to claim 1, wherein the database is included in the mobile device and stores information about the images and global coordinates of the feature points in advance.

4. The system for indoor navigation according to claim 1, wherein the mobile device includes a communication unit and receives information about the images and global coordinates of the feature points stored in the database.

5. The system for indoor navigation according to claim 1, wherein the global coordinate generator photographs a target by using a camera at a predetermined location in an indoor space, and generates a global coordinate from at least two photographed images by using the number of all pixels in the horizontal direction of an image plane photographed by the camera and a distance from the center of the image plane to the feature point.

6. The system for indoor navigation according to claim 1, wherein the mobile device includes:
    a camera for photographing a specific indoor target;

an image processing unit for processing an image of the target photographed by the camera to remove information about unnecessary regions around the target;

a feature point extracting unit for extracting discriminating points in the image refined through the image processing unit;

a feature point comparing unit for comparing the discriminating points extracted by the feature point extracting unit with the generated feature points stored in the database and extracting coincident acquired feature points; and a location and direction recognizing unit for presenting location and direction of the mobile device in the indoor space by using global coordinates of the coincident acquired feature points.

7. The system for indoor navigation according to claim 6, wherein the mobile device further includes a compass for transferring orientation information of the mobile device to the location and direction recognizing unit.

8. A method for indoor navigation, which traces an indoor location through a mobile device, the method comprising:

integrating images of indoor targets photographed by cameras located in an area the mobile device is to be located in advance;

generating a global coordinate for each of a plurality of overlapping feature points of the images;

storing images and global coordinates of the overlapping feature points in a database;

extracting a plurality of feature points from an image of a surrounding environment photographed by a camera included in the mobile device;

comparing the extracted feature points with the overlapping feature points stored in the database; and estimating indoor location and direction of the mobile device based on an overlapping feature points that coincide with any extracted feature points.

9. The method for indoor navigation according to claim 8, wherein the database stores the images of indoor targets by applying histogram intensity patch (HIP) which changes angle and size of the images.

10. The method for indoor navigation according to claim 8, wherein, in said estimating of indoor location and direction, in a case where at least two feature points are extracted, orientation information input through a compass is applied to expected candidate locations to estimate a location corresponding to an orientation condition.

11. The method for indoor navigation according to claim 8, which further comprises photographing a target by using a camera at a predetermined location in an indoor space, and generating a global coordinate from at least two photographed images by using the number of all pixels in the horizontal direction of an image plane photographed by the camera and a distance from the center of the image plane to the feature point.

12. A method for estimating an indoor location of a mobile device, comprising:

generating a plurality of global coordinates corresponding to feature points from at least two images, wherein each image is taken from a designated camera having a predetermined global coordinate within an area the mobile device is to be located;

storing feature point data, including the global coordinate for each of the feature points, in a database;

generating an image of a target with a camera of the mobile device;

extracting a plurality of discriminating points from the image of the target;

comparing the discriminating points to the feature point data stored in the database;

estimating the global coordinate of the mobile device based on the comparison between the plurality of discriminating points and the feature point data.

* * * * *